(12) United States Patent
Gisslin

(10) Patent No.: US 9,068,306 B2
(45) Date of Patent: Jun. 30, 2015

(54) IMPACT ATTENUATOR FOR VEHICLES

(75) Inventor: Lars-Åke Gisslin, Sundsbruk (SE)

(73) Assignee: BIRSTAVERKEN AB, Sundsbruk (SE)

( * ) Notice: Subject to any disclaimer, the term of this patent is extended or adjusted under 35 U.S.C. 154(b) by 77 days.

(21) Appl. No.: 13/990,945

(22) PCT Filed: Dec. 1, 2011

(86) PCT No.: PCT/SE2011/051465
§ 371 (c)(1),
(2), (4) Date: Jun. 10, 2013

(87) PCT Pub. No.: WO2012/074480
PCT Pub. Date: Jun. 7, 2012

(65) Prior Publication Data
US 2013/0248308 A1    Sep. 26, 2013

(30) Foreign Application Priority Data

Dec. 2, 2010  (SE) ...................................... 1051278

(51) Int. Cl.
*E01F 15/14* (2006.01)
*F16F 7/12* (2006.01)

(52) U.S. Cl.
CPC ............... *E01F 15/146* (2013.01); *F16F 7/123* (2013.01)

(58) Field of Classification Search
CPC ............ F16F 7/12; F16F 7/121; F16F 7/123; F16F 7/125; B60R 19/04; B60R 19/34; B60R 21/04; B64D 25/04; B62D 1/192; E01F 15/06; E01F 15/08; E01F 15/10; E01F 15/12; E01F 15/145
USPC ................ 188/371, 372; 297/471, 472, 216.1
See application file for complete search history.

(56) References Cited

U.S. PATENT DOCUMENTS 2,430,319 A    11/1947  Zucker
3,087,584 A *   4/1963  Jackson et al. ................ 188/372
(Continued)

FOREIGN PATENT DOCUMENTS

EP    1 381 737 B1    4/2010
WO   02-26524 A1     4/2002

OTHER PUBLICATIONS

International Search Report (PCT/ISA/210) issued on Feb. 21, 2012, by the Swedish Patent Office as the International Searching Authority for International Application No. PCT/SE2011/051465.
(Continued)

*Primary Examiner* — Anna Momper
*Assistant Examiner* — San Aung
(74) *Attorney, Agent, or Firm* — Buchanan Ingersoll & Rooney, P.C.

(57) ABSTRACT

An impact attenuator for vehicles, including an energy absorbing device for decelerating forces, including a housing, at least two pins arranged in the housing which are arranged in parallel to each other in the housing, as well as a metallic, elongated draw element, which can be positioned within the housing such that it extends between and in contact with the pins, wherein the pins and the draw element are positioned such that a change of direction appears on the draw element when passing by each pin such that at mutual moving of the draw element and the housing in relation to each other, the movement is decelerated due to deformation of the draw element at passage of each pin. The pins and the draw element are positioned such that the draw element obtains a change of direction of at least 90° when passing at least two of the pins.

15 Claims, 3 Drawing Sheets

(56) References Cited

U.S. PATENT DOCUMENTS

| | | | |
|---|---|---|---|
| 3,968,863 A * | 7/1976 | Reilly | 188/372 |
| 5,605,352 A | 2/1997 | Riefe et al. | |
| 6,918,464 B2 | 7/2005 | Renton et al. | |
| 7,188,704 B2 | 3/2007 | Renton et al. | |
| 7,784,874 B2 * | 8/2010 | Murphy et al. | 297/472 |
| 8,439,420 B2 * | 5/2013 | Cantor et al. | 296/68.1 |
| 2003/0111310 A1 | 6/2003 | Renton et al. | |
| 2005/0252718 A1 | 11/2005 | Renton et al. | |

OTHER PUBLICATIONS

The extended European Search Report issued on Apr. 10, 2015, by the European Patent Office in corresponding European Application No. 11845444.6. (7 pages).

* cited by examiner

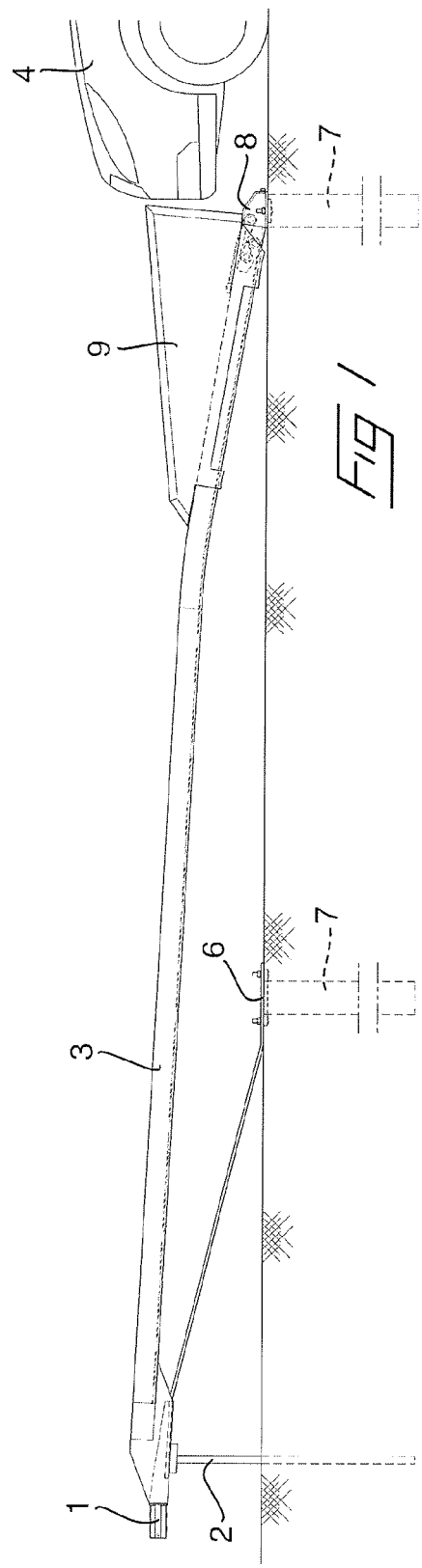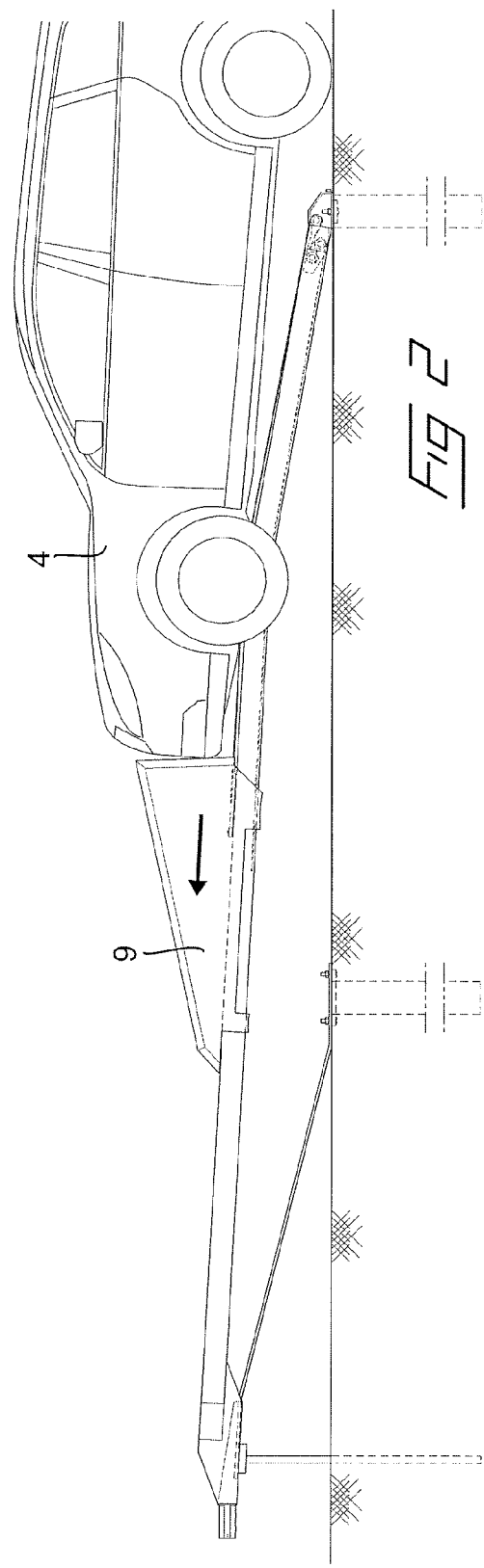

IMPACT ATTENUATOR FOR VEHICLES

The present invention relates to an impact attenuator for vehicles, including an energy absorbing device for decelerating forces, comprising a housing, at least two pins arranged in the housing which are arranged in parallel to each other in the housing, as well as a metallic, elongated draw element, which can be positioned within the housing such that it extends between and in contact with the pins, wherein the pins and the draw element are positioned such that a change of direction appears on the draw element when passing by each pin such that at mutual moving of the draw element and the housing in relation to each other, the movement is decelerated due to deformation of the draw element at passage of each pin, wherein the pins and the draw element are positioned such that the draw element obtains a change of direction of at least 90° when passing at least two of the pins, respectively.

BACKGROUND OF THE INVENTION

In many connections there is a need for impact attenuators, which can absorb and decelerate forces, in particular large forces as for example collision forces from vehicles. For example, this is the case at stationary structures such as safety barriers or crash barriers along roads and railways where it is desirable to decelerate the collision force gradually, partly for security reasons to protect passengers from injuries due to a too powerful retardation, but partly also for cost reasons to make it possible to design the safety barrier with comparatively small dimensions, which cannot withstand a momentarily deceleration of the collision force but which is capable of decelerating the force gradually along a somewhat longer distance. Thereby it is ensured that the safety barrier fulfills its purpose at the same time as the material consumption can be reduced and accordingly also the costs.

One problem with such impact attenuators is that they have to be durable, i.e. have to be in working order during years, maybe several decades of inactivity until someday an accident occurs and then they have to function without having been negatively affected during the lapse of time due to e.g. corrosion, intense contamination of dirt or the like which can make movable parts to jam and be completely blocked such that the function is jeopardized.

SUMMARY OF THE INVENTION

An object with the invention according to a first aspect, is to create an impact attenuator or collision safeguard for collision with vehicles which is uncomplicated, reliable and has comparatively small dimensions and which is capable of effectively decelerating collision forces from vehicles. At least this object is achieved with an impact attenuator according to claim 1.

A further object with the invention according to a second aspect is to create an impact attenuator, which is provided with at least one energy absorbing device or brake, which gives a high braking effect, has small dimensions and an uncomplicated structure and which can be manufactured to a comparatively low cost. This object is achieved by an impact attenuator according to claim 6.

A further object with the invention according to a third aspect is to create an impact attenuator, which is provided with at least one energy absorbing device by which the braking force is progressively increasing with the length of the braking distance. At least this object is achieved by an impact attenuator according to claim 10.

Further features and objects of the invention will be apparent from the following description and remaining claims.

Accordingly, the basis of the invention is the insight that the above object according to the first aspect can be achieved in that the same comprises a beam and a collision catcher, which is connected to the beam and displaceable along its outer side, wherein one of the energy absorbing device or the elongated draw element or traction element or tension element is connected to the collision catcher and is displaceable together with the same, while the other of these both is fixedly connected to the ground or a fixed structure, such that at a possible collision with the collision catcher, this will be decelerated due to the mutual movement between the energy absorbing device and the draw element.

Within this overall inventive idea, an impact attenuator according to the invention can be formed in many different ways within the scope of the following claims. As an example, the pins or shafts, which are positioned with their longitudinal axis perpendicular to the direction of motion of the draw element through the brake, can optionally be non-rotatable or rotatable. Naturally, non-rotatable pins give a higher braking effect due to increased friction. Rotatable pins can at an uncomplicated embodiment be achieved by providing an outer, loose fitting tubular sleeve outside of an inner, non-rotatable pin which is rotatable on the inner pin. Furthermore, the longitudinal draw element could have some arbitrary cross sectional shape which has a sufficient tensile strength to be able to decelerate possible appearing collision forces without fracturing and which has sufficient high bending deformation resistance to be able to absorb the kinetic energy of the vehicle at the deceleration. In the following embodiment, the draw element has the shape of a draw strip having a rectangular cross section. However, the draw element could also have the shape of e.g. one or more rods having a circular cross section or a beam with small dimensions, e.g. a box beam.

In the first exemplary embodiment, an application of an energy absorbing device in an impact attenuator according to the invention is illustrated and described for an end of a safety barrier or road rail. In this embodiment, the energy absorbing device or brake is positioned in the end of a tubular safety barrier terminal beam having a rectangular cross section, one end of which is positioned at the ground and is inclined upwards towards the other end, which is connected to the actual safety barrier. The part of as a draw strip shaped draw element which is to be moved into the break, is in an initial position accommodated in an inner space of the safety barrier terminal beam and the part of the draw element which is to be moved out from the brake is connected to an impact attenuator, which is displaceable arranged on the upper side of the safety barrier terminal beam. If an accident occurs and a vehicle drives into the end of the safety barrier, the vehicle will hit the collision catcher, which thereby will slide along the safety barrier terminal beam and draw the draw element through the brake, with accompanying bending of the draw element around the respective pin such that the collision force is gradually absorbed along a braking distance, which is dependent of the size of the collision force and the maximal braking effect of the brake. In this case the draw element will accordingly move in relation to the housing of the brake, which is fixed connected to the end of the safety barrier terminal beam. It should however be understood that also the inversed condition could be possible, i.e. that the housing of the brake is movable in relation to the draw element, which is fixed connected to the ground or any fixed structure. In the described embodiment with an impact attenuator for a safety barrier, the housing of the brake could be connected and movable together with the impact attenuator, preferably be positioned within the box-formed collision catcher, while the draw element is in one end fixed connected to the safety barrier terminal beam and e.g. is positioned on the upper side of the safety barrier terminal beam.

The inventive impact attenuator is herein only shown attached on the end of a safety barrier where a collision catcher is attached to a safety barrier terminal beam, which is inclined between 5-15° or preferably about 10° in relation to the horizontal plane. However, it will be understood by a person skilled in the art that the inventive impact attenuator also could be utilized in many other connections, in particular where large forces are to be absorbed and decelerated and preferably where these forces appear very sporadic and exceptionally. The impact attenuator is accordingly not limited to be connected to a safety barrier in form of a safety barrier terminal beam along which a collision catcher is displaceable. It would also be possible to e.g. arrange the beam on or wholly or partly buried into the ground and in parallel to the ground in order to prevent accidents at steeps or fixed obstacles, as for example a rock-face or at exit ramps, which can be provided in long and steep downhill slopes to allow stopping of a vehicle whose brakes have ceased to functioning due to e.g. overheating. The impact attenuator could also be arranged in the end of a blind track for railway traffic in order to decelerate railway vehicles, which have lost their operability. Also the shape of the beam can vary within wide limits in dependency of its intended use. In the hereinafter described embodiment it has the shape of a box beam with a rectangular cross section around which the collision catcher engages from the outside. It could however also have e.g. a U-, I-, H- or T-shaped cross section around which the collision catcher engages in a suitable way. Neither does the beam need to be a beam which is specially adapted for the intended use as a safety barrier terminal beam. Instead, the collision catcher could be attached on and displaceable along the safety barrier beam itself, which for example can have a circular shape or a W-shape in cross section. The beam could also be provided with a groove or channel, for example be in form of a concrete beam having embedded edge reinforcements along the groove and an internal free space in which castors or sliding pieces of the collision catcher are displaceable. The impact attenuator could also be assembled of two or more beams, for example two parallel beams with associated collision catchers, which are connected to each other by way of transverse beams or a steel wire netting to increase the catching area. It would even be possible to mount an impact attenuator on a vehicle, where the collision catcher e.g. can have the shape of a front or rear positioned bumper to absorb and decelerate any collision forces.

The energy absorbing device or brake, which decelerates the collision catcher, is formed such that the pins and the draw element are positioned such that the draw element obtains a change of direction of at least 90° at each passage of at least two of the pins. By arranging the pins and the draw element in such a way that the draw element obtains a large change of direction of at least 90° at passage of at least two of the pins, a large braking action is achieved due to the large force that is required to bend the draw element to that large extent around the respective pin. This large braking action can be utilized to restrict the number of pins and make the housing compact with small dimensions. In this way the energy absorbing device can be manufactured to a low cost and its applicability increases since the small dimensions has to result that it takes up less space in the structure where it is to be utilized. It should also be understood that an energy absorbing device having many pins, and thereby a long length of the draw element simultaneously passing through the housing, has to result that also the draw element has to be made correspondingly longer since the rear end of the draw element is not allowed to pass the first pin before the entire braking distance has been utilized. Also a longer draw element gives rice to increasing costs and a larger space for accommodating the draw element in an initial position prior to the braking.

In claim 1 it is stated that the energy absorbing device comprises at least two pins arranged in the housing and that the pins and the draw element are so positioned that the draw element achieve a change of direction of at least 90° at respective passage of at least two of the pins. This naturally implies that the energy absorbing device may contain further pins where the draw element is bended 90° or more, but also that further pins can be arranged at which the draw element gets a change of direction that is less than 90°, e.g. pins which only are adapted for guiding the draw element in a proper direction into or out from the house, respectively. It should however be understood that the change of direction of the draw element at passage of respective pin can be made considerably larger for increasing the braking action, e.g. at least 135°, as is stated in claim 7, or at least 180° as is stated in claim 8, and as in a hereinafter illustrated and described first embodiment where the brake comprises three pins and the change of direction of the draw element is more than 200° at the passage of two of the pins and about 180° at the passage of the third.

In the hereinafter illustrated and described first embodiment of an energy absorbing device or brake, a part of the draw element which is to be moved into the housing and a part of the draw element which is to be moved out from the housing, have directions which differ less than 20° or only about 10° in relation to each other. This is facilitated in that the pins are not located in the same plane and in that it is possible to even have the parts of the draw element which are to be moved into and out from the housing, respectively, in the same direction, i.e. 0° angular difference between the parts, although in separate planes to avoid that the parts of the draw element come into contact with and slides towards each other. This can be an advantage in many situations, e.g. to create a compact and space-saving impact attenuator or the like. By arranging the pins in two or more planes, the brake can be made more compact and shorter in relation to one where all of the pins are positioned in the same plane. It is however within the scope of the invention that, as is illustrated in further embodiments, all of the pins also can be positioned in line in the same plane and the directions between the inward moving and the outward moving parts of the draw element can differ a lot, for example have opposite directions.

An impact attenuator for collision with vehicles should, regardless if it is positioned at a safety barrier end as in the above described embodiment or in any other application, be designed such that it in an acceptable way is able to absorb and decelerate the collision forces from vehicles having greatly differing sizes, such as collision forces from the smallest and most light weight passenger cars as well as from full-loaded trucks. When decelerating collision forces from light weight vehicles, the braking action may not be too large since in that case the deceleration will be so fast that passengers in the vehicle can be seriously injured. When decelerating heavy vehicles, on the other hand, the braking action has to be large such that the braking distance should not be unreasonable long. According to a further developed embodiment of the inventive impact attenuator according to the claims 10-13, the energy absorbing device presents progressively increasing braking action such that the braking action is larger in the end of a braking distance than in the beginning of the braking distance. This can be achieved in that the draw element exhibits a larger bending strength in a rear portion than in a front portion. This can be achieved in different ways, e.g. by forming the draw element with larger dimensions in the rear portion than in the front portion, i.e. to form the draw element with larger width and/or larger thickness, or by forming the draw element of materials having different quality in the rear and front portions, respectively. The progressively increasing braking action can be made stepwise in one or more steps but could also be made continuously over a longer distance by successively increasing the width and/or the thickness.

It is evident that an impact attenuator according to the invention can be modified and varied also in many other ways than has been indicated above. For economical reasons as well as for space saving reasons, it is favorable to design the brake with as few pins as possible. A fewer number of pins will however have to result that the bending strength of the draw element has to be larger in order to achieve the same braking action at equal large change of direction of the draw element past each pin, which also has to result that the amount of material and the costs for the draw element will increase. In order to optimize the draw element in relation to the desired braking action, the number of pins, the change of direction of the draw element at passage of each pin and the dimensions and/or the material quality of the draw element should be so adapted that the tensile strength of the draw element is nearly reached when full braking action is reached in the brake.

BRIEF DESCRIPTION OF THE DRAWINGS

Embodiments of the invention will hereinafter be described with reference to the drawings, which illustrate in:

FIG. 1 a partly cut through side view of a safety barrier end comprising an impact attenuator and an energy absorbing device in an initial position;

FIG. 2 a side view according to FIG. 1 after collision from a vehicle;

DETAILED DESCRIPTION OF POSSIBLE EMBODIMENTS OF THE INVENTION

Figure 3:
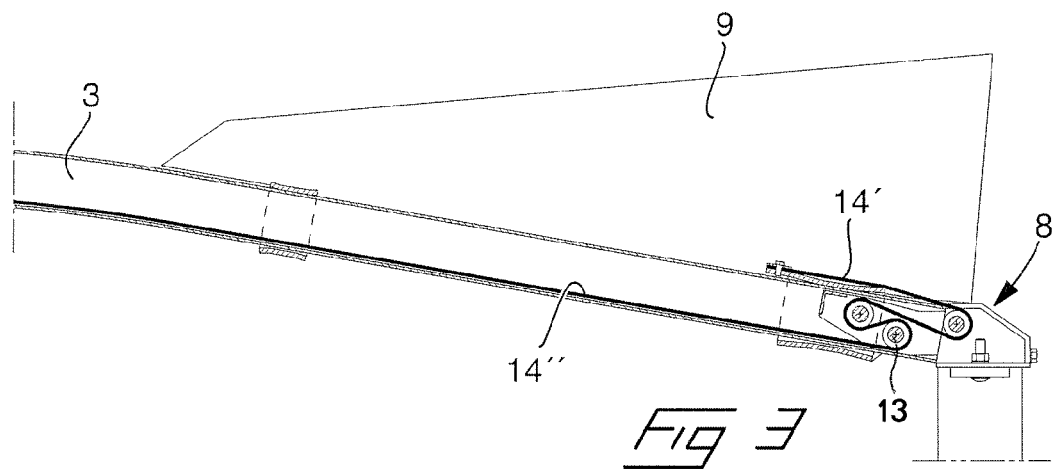
FIG. 3 an enlarged longitudinal section through the outer end of the impact attenuator in the initial position according to FIG. 1.

Firstly, an energy absorbing device will be described according to a first embodiment and the application of the same at an impact attenuator for collisions with vehicles at an end of a safety barrier. In FIG. 1, the end of the safety barrier is shown with the impact attenuator in an initial position. The safety barrier according to the illustrated embodiment is of the type which is composed of a safety barrier beam 1 having a rectangular cross section which is supported on a distance above a roadway by means of safety barrier posts 2, which are driven down through the roadway and into the roadbed. Of the actual safety barrier only the outermost end and the last safety barrier post 2 are shown. From the safety barrier extends a safety barrier terminal in form of a safety barrier terminal beam 3, having likewise a rectangular, hollow cross section, which in its one end is fixedly connected to the safety barrier and is sloping downwards to abutment against the roadway in its other end. This is done to give the safety barrier a smooth terminal and protect the passengers in a vehicle 4 at a possible collision against the end of the safety barrier. For secure anchoring of the safety barrier in relation to the roadway, a tie-rod 5 is arranged between the safety barrier and the roadway such that the one end of the tie-rod is fixedly connected to the actual safety barrier at the area of the last post 2 and the other end of the tie-rod is anchored in the roadway by an anchoring plate 6, which bears against the roadway and is anchored by means of an anchoring tube 7, which is driven down into the roadbed. Also the outer end of the safety barrier terminal beam 3 is anchored towards the roadway by means of a corresponding anchoring plate, which is anchored in the roadway by means of an anchoring tube 7, which is driven down into the roadbed.

In order to further protect vehicles and passengers at a possible collision against the safety barrier end, it is provided with an impact attenuator comprising an energy absorbing device or brake 8 to successively decelerate the collision force. The impact attenuator comprises a box-shaped collision catcher 9, which is displaceable arranged on the upper side of the safety barrier terminal beam 3, and the brake 8 which is fixedly mounted and at least partly inserted in the outermost end of the safety barrier terminal beam 3.

Figure 4:
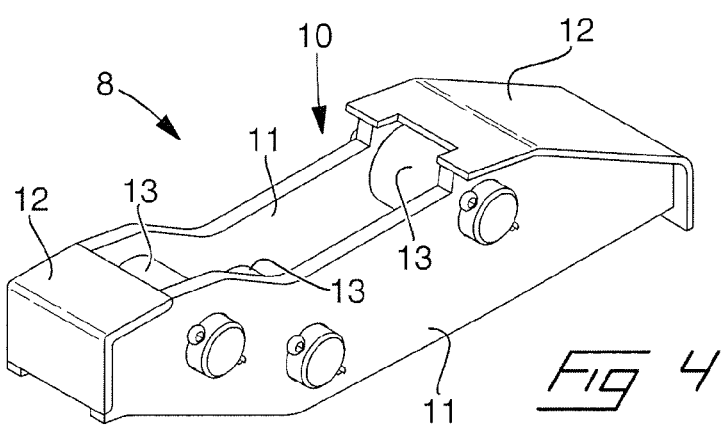
FIG. 4 a perspective view of the energy absorbing device according to FIGS. 1-3.
Figure 5:
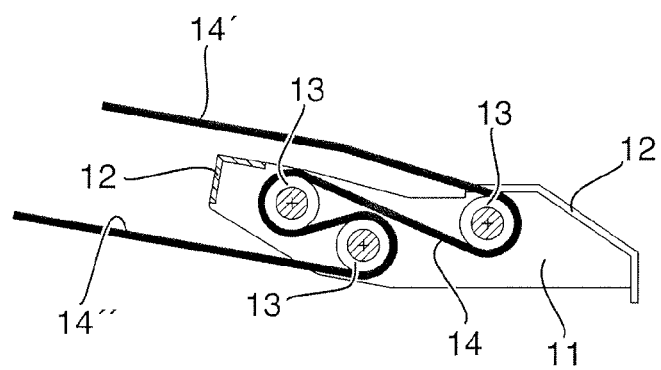
FIGS. 5-9 schematic longitudinal sections, showing the mutual positions of the pins and the extension of the draw element between these, for different possible embodiments of energy absorbing devices.

The more precise design of the brake 8 appears more in detail from FIGS. 3-5. The brake is according to FIG. 4 designed as a housing 10 having two long side portions 11, which are interconnected by two cross pieces 12 and between which three rotatable pins 13 are arranged. The brake also comprises a draw element 14, in form of a draw strip of steel, which is adapted to be applied between the pins in the way as is shown in FIGS. 3 and 5. The width and thickness of the draw element can vary within wide limits in dependence of the field of application, desired braking action and the design of the brake. When using the draw element in an impact attenuator of the type as is illustrated herein, the thickness of the draw element can normally be considered to amount to about 5 to 10 mm and have a width of about 100 mm. Such a robust draw element cannot be bent by hand when mounting in the housing. Instead it must be pre-bent by means of some type of tool and subsequently be inserted into the housing with the pins 13 disassembled and thereafter re-mounting of the pins when the draw element is in the correct position. As is apparent from FIG. 3, one end of the draw element 14, more precisely the end of a part 14' which is to be moved from the housing, which in an initial position is relatively short, is fixedly connected to the box-shaped collision catcher 9 in its inner space. An opposite part 14" of the draw element which is to be moved into the housing, has in an initial position a very long length and is inserted into the inner cavity of the safety barrier terminal beam 3.

At a possible collision of a vehicle 4 with the safety barrier end, as is illustrated in FIG. 2, the collision catcher 9 will be displaced along the safety barrier beam 3. Hereby, the draw element 14 will be drawn through the brake 8 and due to the bending of the strip, when it runs around each of the pins 13 in the brake, the collision force will be absorbed and decelerated during a braking distance which, besides the characteristics of the brake, is dependent of the speed and weight of the vehicle. After such a collision at least the draw element 14 should be exchanged while the other parts, as the safety barrier terminal beam 3, the collision catcher 9 and the brake housing 10 as a rule can be reused.

Thereafter, reference is made to FIGS. 5-9 in which are shown examples of different embodiments of energy absorbing devices or brakes 8, which can be considered to be utilized in the impact attenuator according to the invention. The Figs. are only schematic cross sections showing different numbers and positions of the pins 13 and thereby different travel paths for the draw element 14 through the brake with different sized changes of direction at passage past the respective pin.

In FIG. 5 is first schematically shown the mutual position of the pins 13 and the travel path of the draw element 14 through the brake 8 according to the already described embodiment in FIGS. 1-4. This brake contains three pins and the change of direction of the draw element at passage of respective pin varies between about 185° and 220°. At this brake, all of the pins are not located in the same plane and the part 14" of the draw element which is to be moved inwards and the part 14' of the draw element which is to be moved outwards are principally located in the same direction having an angular difference of only about 10° between them.

Figure 6:
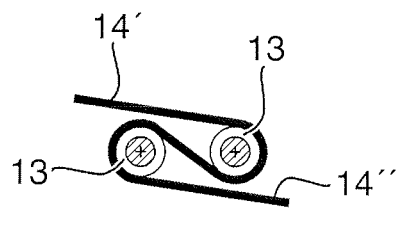

The brake according to FIG. 6 has only two pins 13 but the change of direction of the draw element at passage of respective pin is relatively large, about 210°, which has to effect that the braking action although will be comparatively large. At this embodiment, the inward moving part 14" and the outward moving part 14' of the draw element are oppositely directed.

Figure 7:
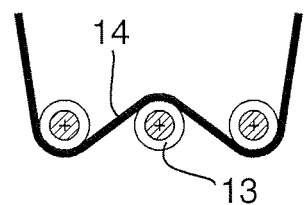

FIG. 7 illustrates a brake having three pins 13, wherein the change of direction of the draw element 14 at passage of the two outer pins are about 120° while it is only about 70° at passage of the middle pin. All three pins are located in the same plane and the angle between the inward moving and outward moving parts of the draw element is about 15°.

Figure 8:
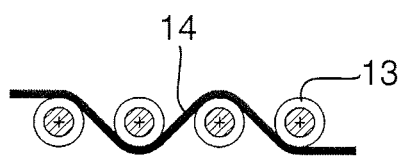

The brake according to FIG. 8 has four pins 13 at which the change of direction of the draw element 14 is about 90° at passage of the two middle pins but only about 40° at passage of the two outermost. The braking action for a brake designed in this way will be lower in comparison to the earlier described but falls nevertheless within the scope of protection of claim 1, which stipulates that at least two pins should give a change of direction of at least 90° of the draw element.

Figure 9:
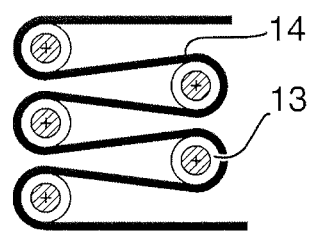

FIG. 9 shows a brake, which contains five pins 13 which each provides a relatively large change of direction of the draw element 14 of between about 185° and 195°. The braking action for a brake designed in this way will therefore be large.

Figure 10:
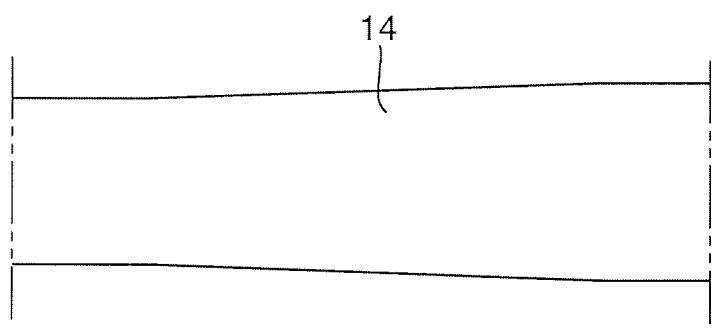
FIG. 10 a view from above of a portion of a draw element, which has an increasing bending strength by way of an increased width.
Figure 11:
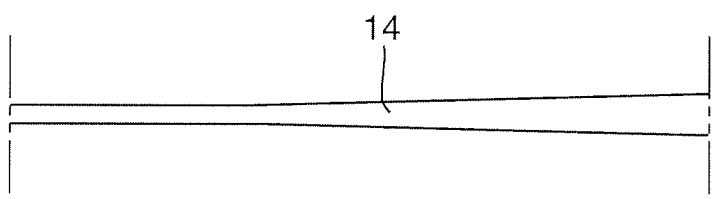
FIG. 11 a side view of a portion of the draw element, which has an increasing bending strength by way of an increased thickness.

One problem with an impact attenuator, e.g. according to FIGS. 1-3 or any other type of impact attenuator for collision with vehicles, is that it should be able to decelerate the collision force from a small, lightweight passenger car as well as a fully loaded truck without the braking distance for a light weight vehicle being too short, such that the impact severity on the passengers in the vehicle will become too large, or being excessively long for a heavy vehicle such that the costs and the required space for the impact attenuator become unreasonable large. To overcome this problem an impact attenuator according to the present invention can be provided with a brake, which has a progressively increasing braking action such that the draw element is provided with a larger bending strength in a rear portion, which passes the brake last, than in a front portion, which passes the brake first. This progressively increasing braking action can then be balanced such that if a light weight vehicle run into the impact attenuator 9, it is brought to standstill during an acceptable long first braking distance when the braking action is comparatively low, while if it is a heavier vehicle, such e.g. a truck or a bus, it will exceed this first braking distance and thereafter the braking action is increased which will shorten the remaining braking distance for the vehicle. This progressively increasing braking action can, according to the invention, be achieved principally in three different ways. On the one hand by providing the draw element 14 with an increasing width in the longitudinal direction, as is shown in FIG. 10, or an increasing thickness, as is shown in FIG. 11, or to change the material quality of the draw element to a material quality having a larger bending strength. These measures to increase the bending strength of the draw element in the longitudinal direction can be provided alone or in combination and the increasing bending strength can be provided stepwise in one or more steps or continuously over a longer distance. The latter is possible at least when increasing the width or thickness of the draw element but can be more difficult to achieve when changing the material quality.

The invention claimed is:

1. An impact attenuator for vehicles, including an energy absorbing device for decelerating forces, comprising a housing, at least two pins arranged in the housing which are arranged in parallel to each other in the housing, as well as a metallic, elongated draw element, which can be positioned within the housing such that the elongated draw element extends between and in contact with the pins, wherein the pins and the draw element are positioned such that a change of direction appears on the draw element when passing by each pin such that at mutual moving of the draw element and the housing in relation to each other, the movement is decelerated due to deformation of the draw element at passage of each pin, wherein the pins and the draw element are positioned such that the draw element obtains a change of direction of at least 90° when passing at least two of the pins, respectively, wherein the impact attenuator comprises a beam and a collision catcher, which is connected to the beam and displaceable along an outer side of the collision catcher, wherein one of the energy absorbing device or the draw element is connected to the collision catcher and displaceable together with it, while the other of these is fixedly connected to the ground or a fixed structure such that at a possible collision with the collision catcher, this is decelerated due to the mutual movement between the energy absorbing device and the draw element.

2. An impact attenuator for vehicles according to claim 1, wherein the impact attenuator comprises a beam having a tubular cross section, wherein the energy absorbing device is applied in one end of the beam, a part of the draw element, which is to be moved out from the housing, is connected to a collision catcher, which is connected to the beam and displaceable along an outer side of the collision catcher, and wherein a part of the draw element which is to be moved into the housing, is in an initial position accommodated in the tubular inner of the beam.

3. An impact attenuator according to claim 1, wherein the beam is inclined in relation to the ground-level plane such that one end is connected to a safety barrier, while the other end is located close to the ground and the beam is sloping upwards in an angle between 5-15° from this end.

4. An impact attenuator according to claim 1, wherein the collision catcher extends upwards from the upper side of the beam.

5. An impact attenuator according to claim 1, wherein the draw element is movably arranged, while the housing is fixedly arranged in relation to a structure and/or the ground.

6. An impact attenuator according to claim 1, wherein the at least two pins arranged in the housing comprise at least three pins, wherein the at least three pins are located in at least two separate planes.

7. An impact attenuator according to claim 1, wherein the pins and the draw element are located such that the draw element will have a change of direction of at least 135° at respective passage of at least two of the pins.

8. An impact attenuator according to claim 1, wherein the pins and the draw element are located such that the draw element will have a change of direction of at least 180° at respective passage of at least two of the pins.

9. An impact attenuator according to claim 1, wherein a part of the draw element moving inwards toward the housing and a part of the draw element moving outwards from the housing, extend in directions which differs maximum 20° in relation to each other.

10. An impact attenuator according to claim 1, wherein the impact attenuator is provided with progressively increasing braking action such that the braking action is larger in the end of a braking distance than in the beginning of the braking distance further the draw element has a larger bending strength in a rear portion than in a front portion.

11. An impact attenuator according to claim 10, wherein the progressively increasing braking action is achieved in that the draw element has an increasing width in opposite direction in relation to the movement of the draw element in relation to the housing.

12. An impact attenuator according to claim 10, wherein the progressively increasing braking action is achieved in that the draw element has an increasing thickness in opposite direction in relation to the movement of the draw element in relation to the housing.

13. An impact attenuator according to claim 10, wherein the progressively increasing braking action is achieved in that the draw element has a changed material quality with increasing bending strength in opposite direction in relation to the movement of the draw element in relation to the housing.

14. An impact attenuator according to claim 1, wherein the draw element has the shape of a draw strip.

15. An impact attenuator according to claim 1, wherein the pins are rotatable.

* * * * *